Fig.6

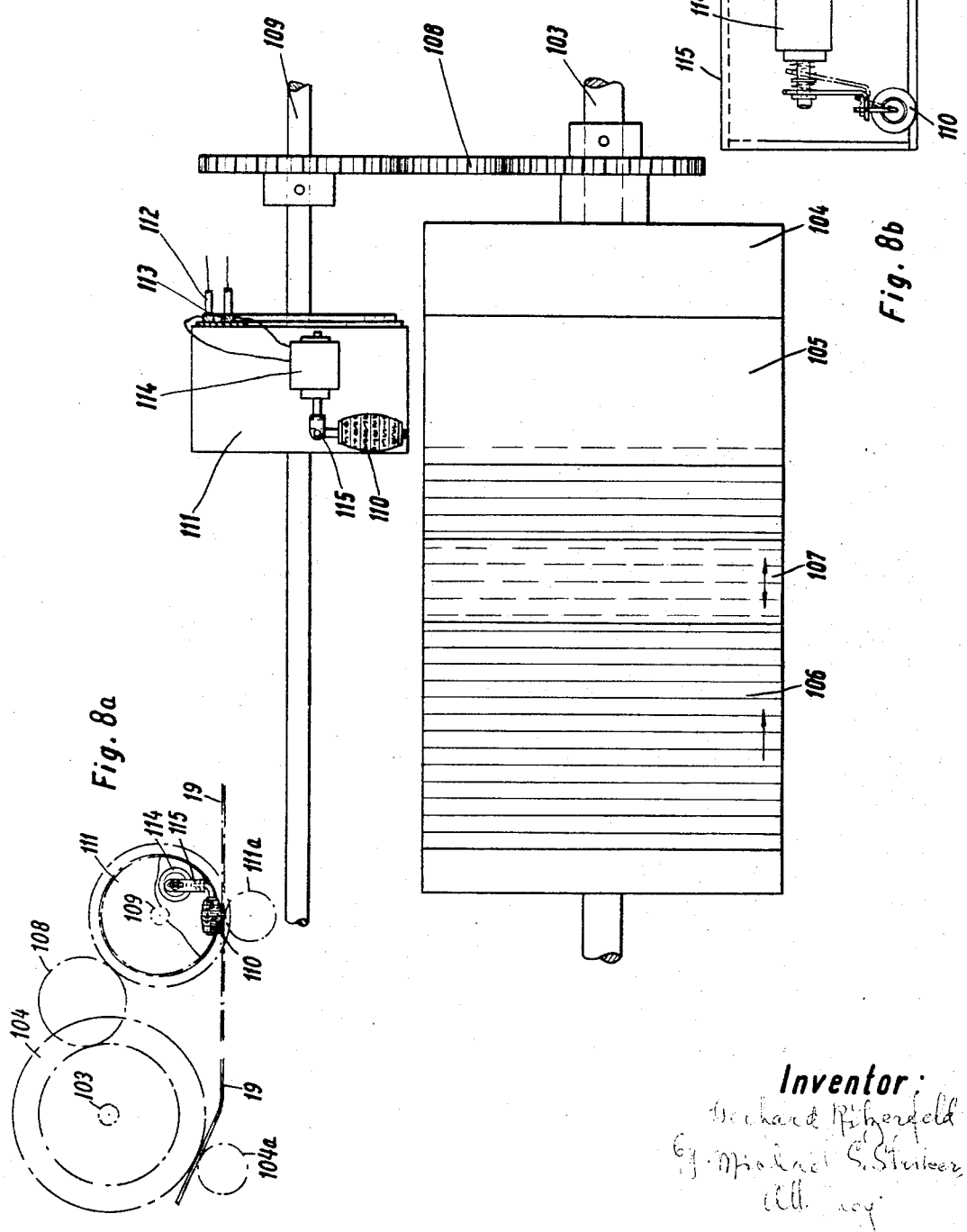

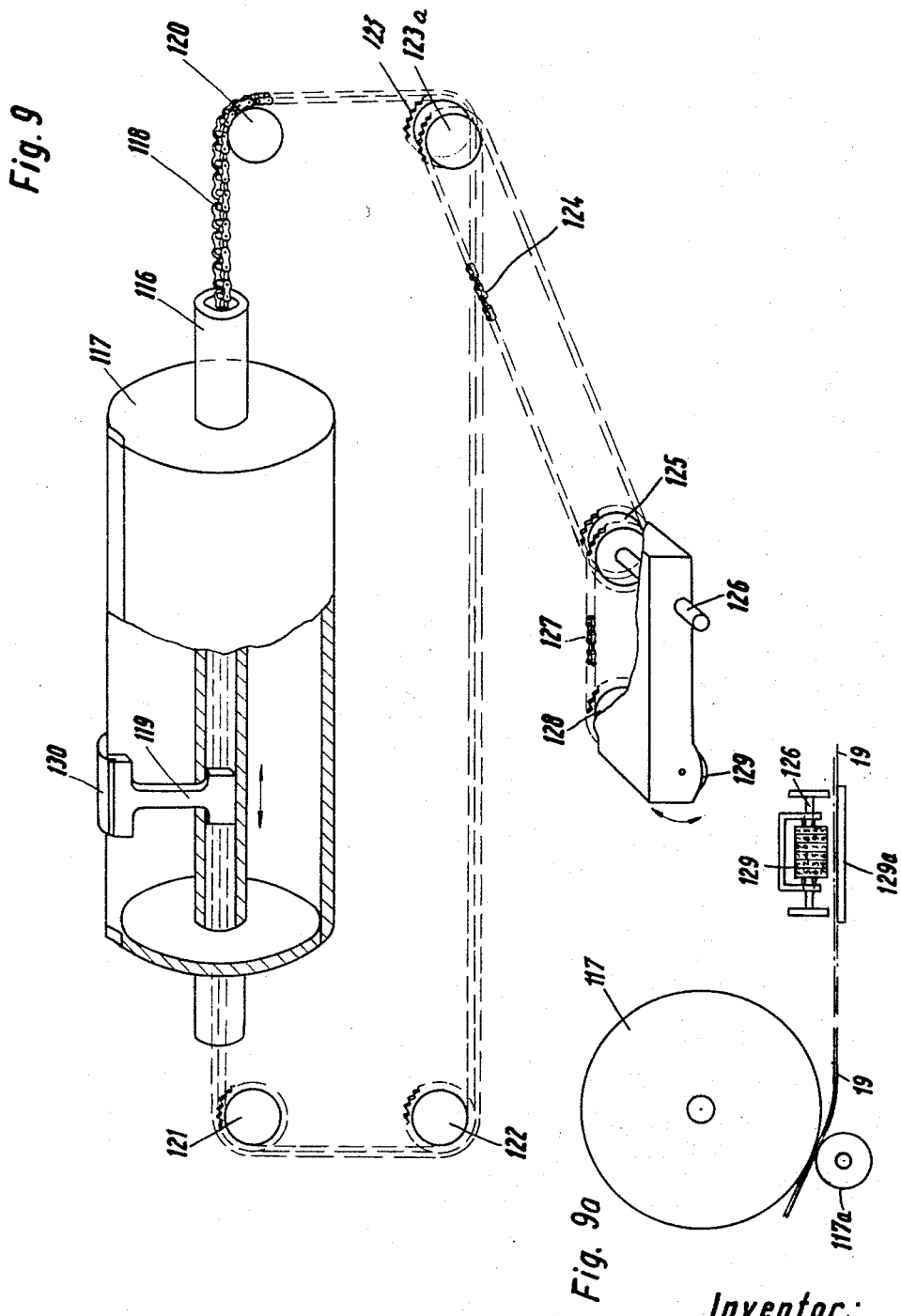

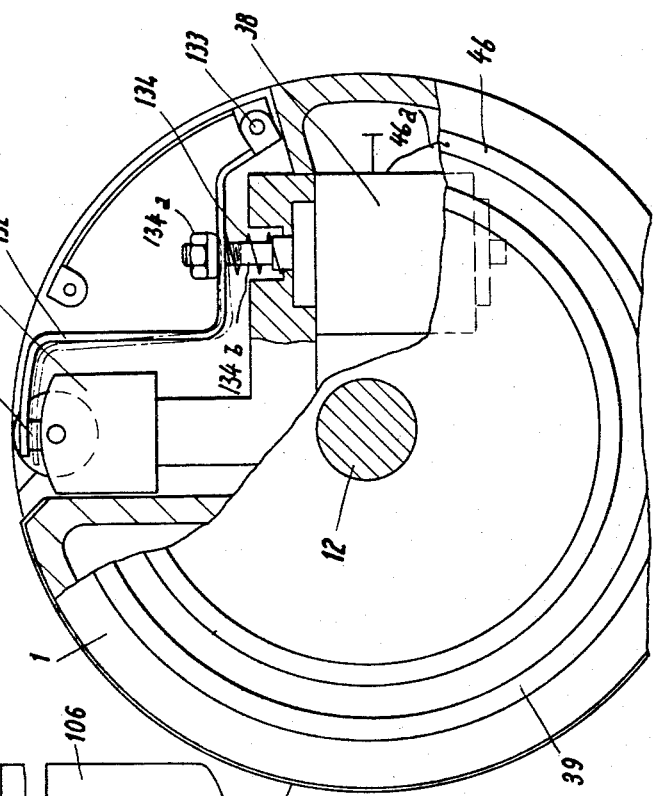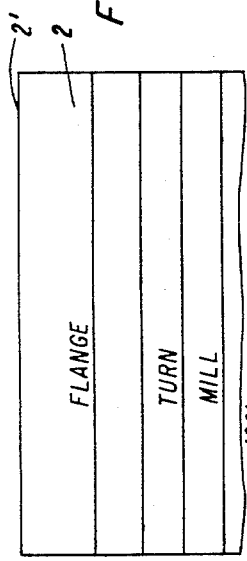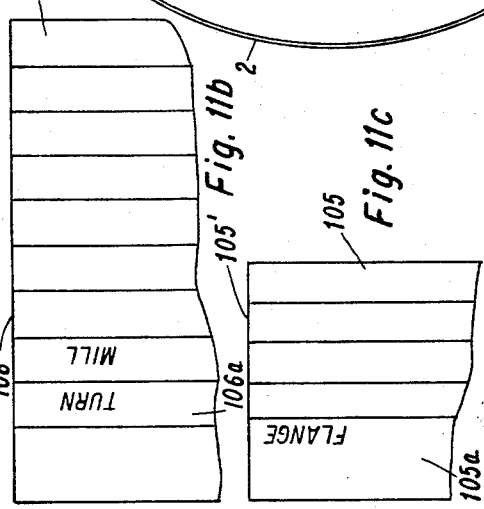

United States Patent Office

3,420,163
Patented Jan. 7, 1969

3,420,163
NUMBERING ARRANGEMENT FOR SELECTIVE
PRINTING MACHINES
Gerhard Ritzerfeld, 21 Franzensbader Strasse 1,
Berlin 33, Germany
Filed Apr. 13, 1967, Ser. No. 630,579
Claims priority, application Germany, Apr. 18, 1966,
R 43,073
U.S. Cl. 101—76                             19 Claims
Int. Cl. B41l 45/00

ABSTRACT OF THE DISCLOSURE

The printing drum of a rotary duplicator is provided with a numbering device which is shifted to the next number whenever different text section of a printing form is printed on a copy sheet so that copy sheets having different texts are consecutively numbered.

Background of the invention

The present invention relates to printing and duplicating machines by which text sections, such as lines or columns can be selectively or successively printed on copy sheets. It is known to provide the printing drum of a rotary duplicator with a stamping device for printing variable data on the copy sheets in addition to the text sections of the printing form. These stamping devices are manually set to print a certain number which remains the same for all copy sheets printed from a printing form, and after all printing operations concerning a printing form were completed, the stamping device is cleared and set to a new position for the next following printing operations with a new printing form.

It is also known to provide printing machines with numbering devices which are automatically shifted upon each printing operation to print consecutive numbers on copy sheets receiving imprints of the same text.

Summary of the invention

It is one object of the invention to provide a selective printing machine with a numbering device printing consecutive numbers on successive copy sheets which receive imprints of different text sections of the same printing form.

It is also an object of the invention to provide identification or account numbers for forms used in data processing machines for organizing successive operations to be carried out on a workpiece.

The identification number, the so-called "address" includes a reference numeral identifying the respective printing form which, for example, may relate to a workpiece or a specific order, and an additional series of numbers corresponding, for example, if consecutive operations on the workpiece are concerned, with the text section of the printing form and the corresponding operations required on the workpiece. The several copy sheets, each of which contains a text section of the printing form identifying a different operation to be carried out on the workpiece, and which as a rule also have a heading identifying the workpiece, also receive for each text section or line, a different identification number which is printed in a form adapted to be read out by optical or magnetic automatic readers and directly read into an automatic electric data processing system so that the corresponding storage positions in the magnetic storage can be interrogated and an evaluation of the stored data corresponding to the reading out of the printed information becomes possible. The identification number may, for example, be printed in OCR or CMC 7 script which can be automatically read out. Briefly speaking, the present invention resides in the combination of the printing of lines from the same printing form on separate copy sheets, with a corresponding printing of consecutive identification numbers on the copy sheets for the purpose of being evaluated by data processing machines.

In accordance with the invention, a rotary duplicator is provided with a numbering device having in each order a printing wheel and a tens transfer means, and the numbering device is actuated depending on the varying printing of lines or text sections of the printing form or on the selector by which the lines or text sections are selected for printing.

One embodiment of the invention comprises printing means including a rotary printing drum on which a printing form having a plurality of text sections is mounted, actuating means operable for controlling the printing means to print after printing any one text section on a copy sheet, a different text section on at least one other copy sheet; and a numbering device having number printing means operable to print consecutive numbers, and being operated by the actuating means in the operative condition so that copy sheets on which different text sections are printed, are imprinted by the number printing means with consecutive numbers.

In the preferred embodiment of the invention the numbering device is mounted on the printing drum for rotation therewith and has a series of printing wheels connected by tens transfer means. Furthermore, in accordance with the invention, the printing means are controlled to automatically print successive text sections of the printing form on successive copy sheets during successive revolutions of the printing drum so that the copy sheets have different text sections or lines printed thereon and are provided with different numbers. Irrespective of whether one, two or more text sections are printed on a copy sheet, the numbering device is shifted to provide different numbers for copy sheets having different text sections printed thereon.

In one embodiment of the invention, the numbering device is actuated by an electromagnet, built with the numbering device into a recess of the printing drum. Another electromagnet which controls the printing of selected text sections of the printing form on the copy sheets, is automatically energized during the rotation of the printing drum, or by a manual operation while the machine is at a standstill.

In another embodiment of the invention, the numbering device is actuated by a mechanical linkage. In another embodiment of the invention, the numbering device is actuated when a printing form is shifted on the printing drum for printing a different text section.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Brief description of the drawing

FIG. 6 is a fragmentary elevation, partially in section, illustrating another embodiment of the invention in which the numbering device is controlled by mechanical linkage;

FIG. 8 is a fragmentary elevation illustrating another embodiment of the invention;

FIG. 8a is a schematic end view, partially broken off, of the embodiment of FIG. 8;

FIG. 8b is a side view of a detail of FIG. 8;

FIG. 9 is a fragmentary perspective view illustrating another embodiment of the invention;

FIG. 9a is a schematic end view of the embodiment of FIG. 9;

FIG. 10 is a cross section of a printing drum provided with a modified numbering device; and FIGS. 11a to 11c illustrate different printing forms.

*Description of the preferred embodiments*

Figure 1:
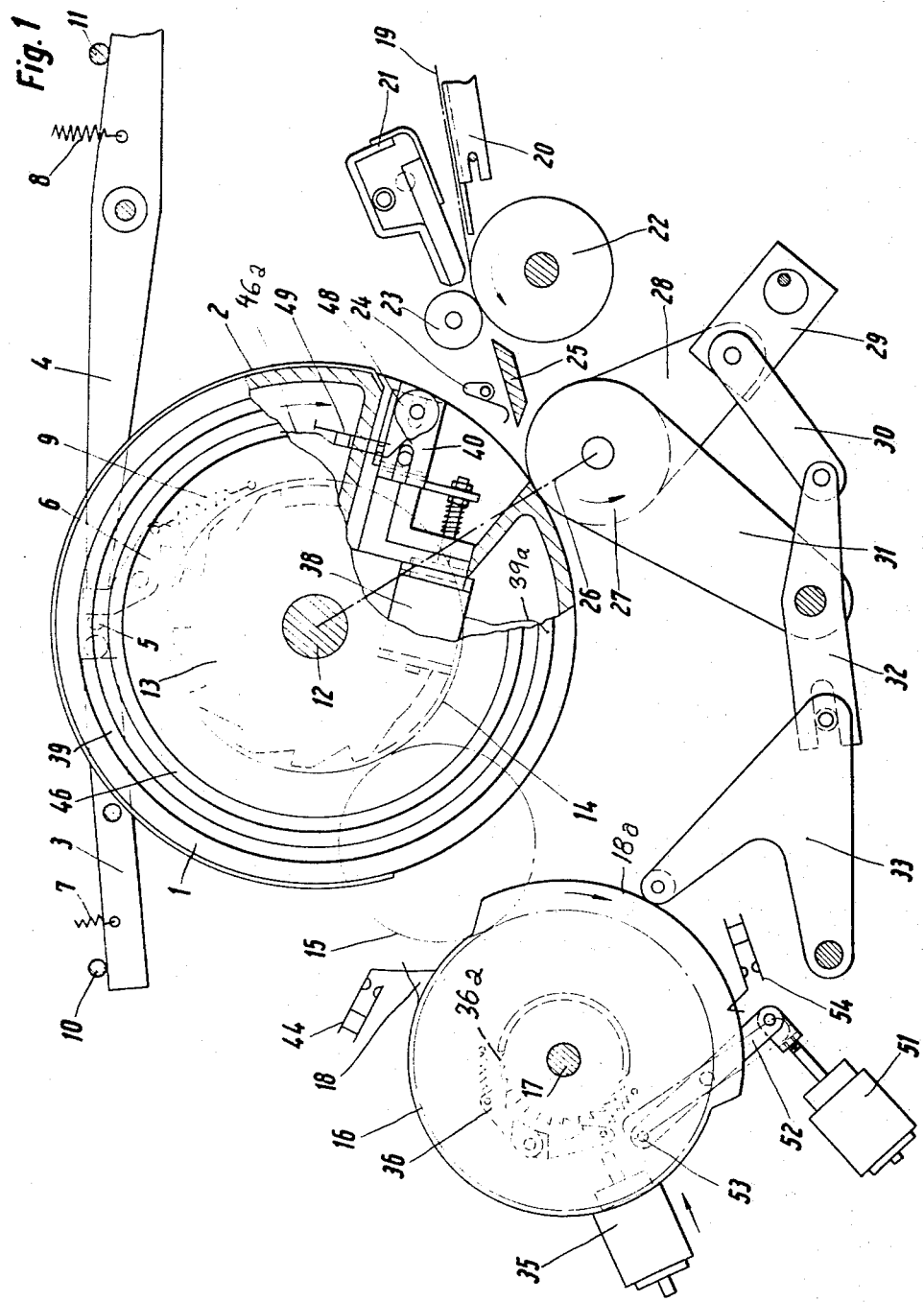
FIG. 1 is a fragmentary side view, partially in section, illustrating a rotary selective duplicator with a cam controlled counterpressure roller provided with a numbering arrangement according to one embodiment of the invention.

Referring first to the embodiment of FIGS. 1 to 4, a printing drum 1 has holding means 1' for holding the edge 2' of a printing form 2 on the periphery thereof. As shown in FIG. 11a, printing form 2 has axial lines or text sections parallel to edge 1' and being circumferentially spaced. Printing drum 1 is mounted on shaft 12 for free rotation, and is driven from shaft 12 through a one-revolution coupling including a toothed coupling wheel 13 driven by shaft 12 and a coupling pawl 6 which is urged by spring 9 to turn to a position engaging coupling wheel 13, but is prevented from turning by a start lever 4 which is urged by spring 8 against stop 11 and into the illustrated position locking pawl 6 which abuts a stop 5. Another lever 3 is urged by spring 7 to abut stop 10 in the illustrated position. When start lever 4 is operated to release pawl 6, the same engages drive wheel 13 and since pawl 6 is mounted on the printing drum 1, the same turns until pawl 5 engages after one revolution lever 4 and releases drive wheel 13. This arrangement is known and not an object of the invention.

Figure 3:
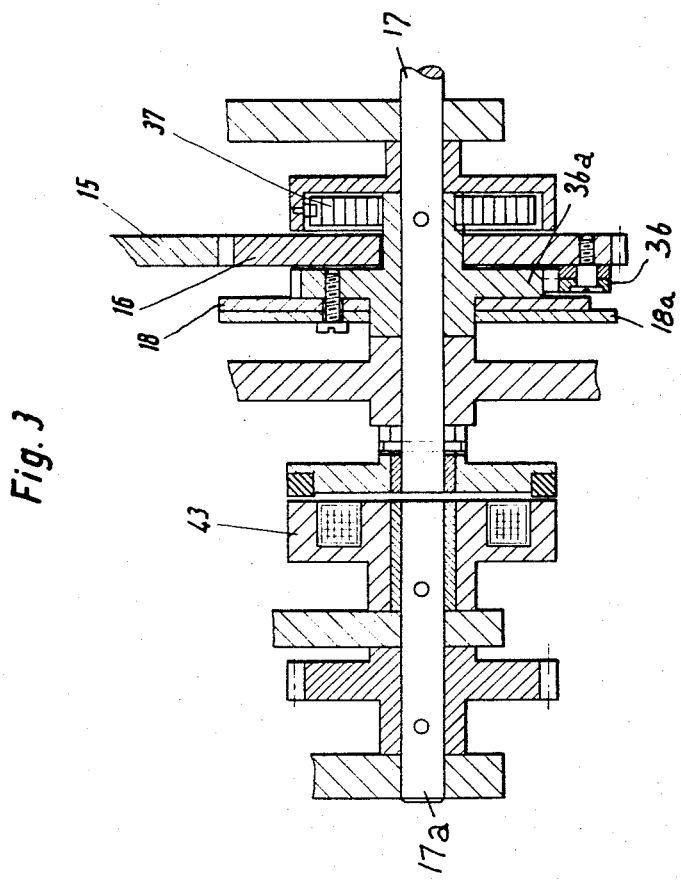
FIG. 3 is a fragmentary sectional view illustrating means by which the successive printing of text sections are controlled in the embodiment of FIG. 1.

As best seen in FIGS. 1 and 3, a shaft 17 carries a ratchet wheel 36a cooperating with spring biased pawl means 36 mounted for pivotal movement on gear 16 which is connected by gear 15 to a gear 14 secured to printing drum 1. A head cam 18a and a line cam 18 are secured to ratchet wheel 36a and are rotated during rotation of the printing drum 1 when pawl 36 engages ratchet wheel 36a. The hub of ratchet wheel 36a is secured to shaft 17 and to the inner end of a spiral spring 37 whose outer end is secured to a fixed housing. Shaft 17 carries a coupling part of an electromagnetic coupling 43 so that shaft 17 can be rotated by a motor, not shown, when the coupling 43 is energized.

During rotation of cams 18, 18a, a linkage including a cam follower lever 33, and a toggle lever system 32, 30, 31, 28 are operated to move a counterpressure roller 26 to and from a printing position cooperating with the printing form on printing drum 1. The exact position of the counterpressure roller can be adjusted by an eccentric member within a circular bore in a support 29 on which toggle levers 28 and 30 are mounted. This arrangement is known and not an object of the invention, and described in detail in the U.S. Patent 2,868,116.

A copy sheet 19 is supplied to a table 20 and passes under moistening means 21 to a pair of transporting rollers 22, 23 which deliver the copy sheet over a support 25 and a holding spring 24 to the printing plane 26 connecting the axes of printing drum 1 and counterpressure roller 27.

An electromagnet 35 moves, when energized, its armature against pawl 36 so that the same releases ratchet wheel 36a. Another electromagnet 51 has an armature controlling the angular position of lever 52 carrying a stop 53 located in the actuated position of lever 52 in the circular path of movement of pawl 36 when the same rotates with ratchet wheel 36 in the illustrated engaged position. Upon engagement of pawl 36 by stop 53, pawl 36 momentarily releases ratchet wheel 36a. This arrangement is described in the U.S. Patent 2,868,116.

Switches 44 and 54 cooperate with cam 18 in a manner which will be described in greater detail hereinafter.

An actuating magnet 38 is mounted in a cavity of printing drum 1 and has one terminal connected to mass and another terminal connected to a slide contact 39a engaging a slide ring 39. Another slide ring 46 is engaged by a slide contact connected to a switch 49. Switch 49 is operated by a cam 48 of the numbering device 40 which is driven by motor 47.

Figure 4:
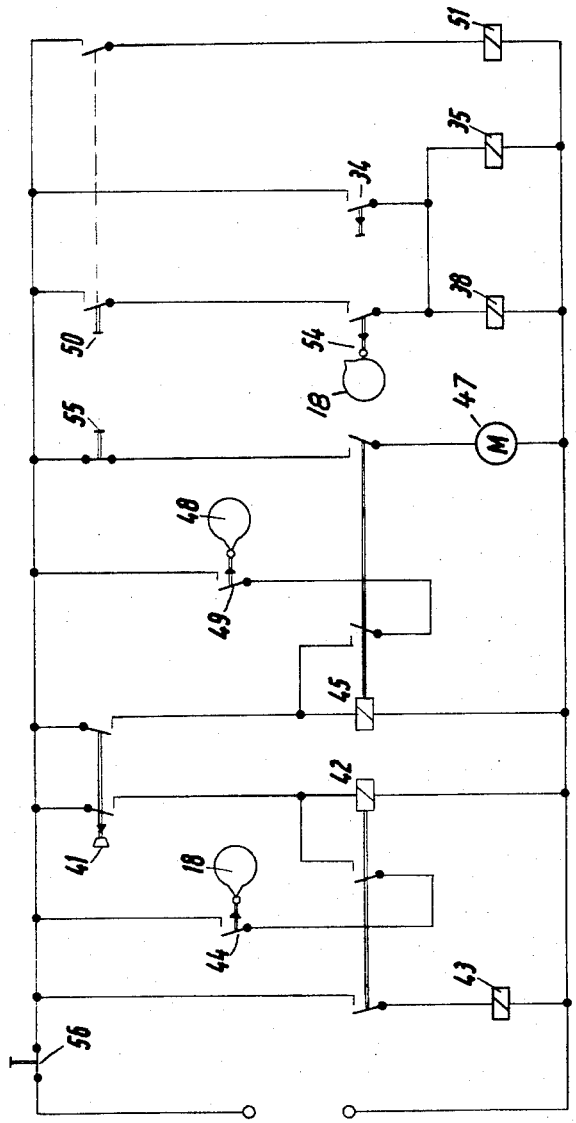
FIG. 4 is a diagram illustrating the electric circuit of the embodiment of FIG. 1.

Referring now to the electric circuit illustrated in FIG. 4, one terminal of a voltage source is connected to a main switch 56 which is in series with all other switches of the circuit. A first line connecting the terminals includes electromagnetic coupling 43 and a first relay contact of a relay 42. The second contact of relay 42 is connected in series with switch 44 which, as noted above, is operated by the line cam 18 which controls the printing of line or text sections of the printing form by operating counterpressure roller 27 through the lever system 28 to 33.

Figure 2:
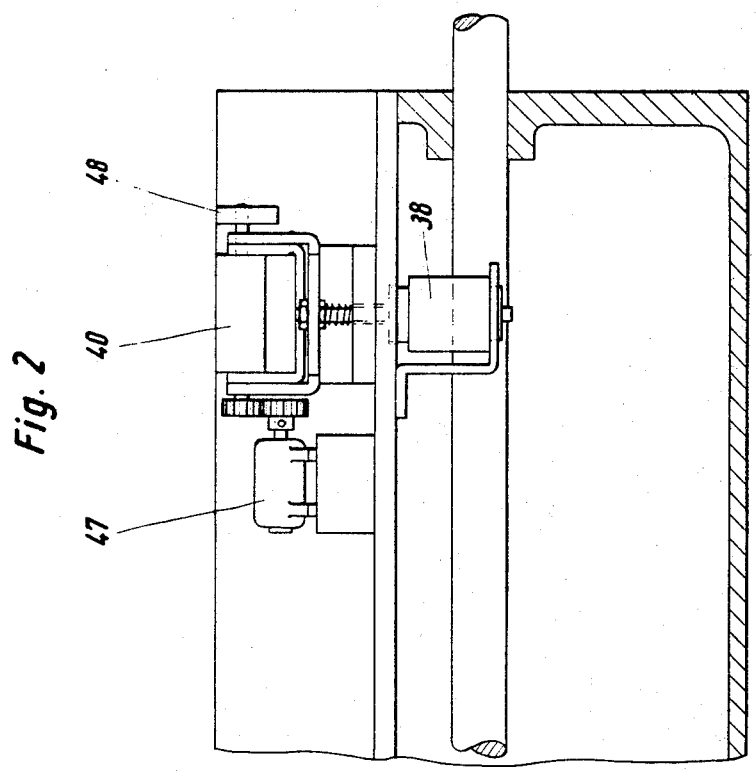
FIG. 2 is a fragmentary radial section of the printing drum of the embodiment of FIG. 1 showing the numbering device with its drive motor and actuating electromagnet.

A third line between the terminals contains relay 42 and the first contact of a clearing switch 41. The next line contains another relay 45 and a second contact of clearing switch 41. Relay 45 controls a relay contact connected in series with switch 49 located in the printing drum and operated by cam 48 of the numbering device. The next line contains a second contact of relay 45 connected in series with motor 47 by which the numbering device is driven, as shown in FIG. 2, and a switch 55 by which motor 47 can be started and disconnected. The next line contains electromagnet 38 by which the numbering device is actuated, the switch 54 controlled by cam 18, and a contact of a manually operated switch 50. A stepping electromagnet 35 is connected to a point between switch 54 and electromagnet 38, and is also connected to a switch 34 which is operated by a selector key, not shown. The last line contains electromagnet 51 by which pawl 36 can be released, and the second contact of switch 50 which starts the printing of successive lines or text sections on successive copy sheets.

When the line selector key, not shown, is operated, switch 34 is closed, and stepping electromagnet 35 is energized so that its armature releases pawl 36, permitting ratchet wheel 36a to turn one step under the action of the spiral spring 37 whereupon pawl 36 again engages and stops ratchet wheel 36a. At the same time, actuating electromagnet 38 is energized since switch 34 is connected to slide ring 39 on which slide contact 39a of actuating electromagnet 38 slides. The armature of actuating electromagnet 38 is shifted, and acts on the conventional operating means of the numbering device to set the same to the next following number.

If a lower line number than the previously set number is desired, or if a new printing form has been attached to the printing drum, and the copy sheets are to be printed with consecutive numbers starting again with 1, the clearing switch 41 is actuated so that relay 42 is energized and closes its contacts. The first relay contact connects the electromagnetic coupling 43 into the circuit so that, as shown in FIG. 3, shaft 17 is driven from shaft 17a and turns line cam 18 back to its initial position in which it engages and opens switch 44 so that relay 42 is de-energized and electromagnetic coupling is disconnected from the voltage source by the respective relay contact. Relay 45 is also energized when switch 41 is operated, so that motor 47 is energized by the respective relay contact over slide ring 46 and slide contact 46a and turns numbering device 40 until it is cleared and indicates zero. In this position, motor 47 is disconnected when cam 48, which is mounted on the shaft of the numbering device, engages and opens switch 49.

When automatic printing of successive lines or text sections of the printing form on consecutive copy sheets is desired, switch 50 is closed, and electromagnet 61 is energized and places stop 53 in the operative position located in the path of movement of pawl 36. During each revolution of the printing drum and of cam 18, pawl 36 engages stop pin 53 of lever 52 so that ratchet wheel 36a is momentarily released and is turned by spiral spring 37 one step in a direction of rotation opposite to the normal direction of rotation so that line cam 18 is correspondingly displaced to engage cam follower 33 later than during the preceding revolution whereby the counterpressure roller 27 is shifted to the printing position at the moment when the next following line or text section of the printing form passes through the printing plane 26.

During each rotation of line cam 18, switch 54 is operated so that actuating electromagnet 38 is energized over slide ring 39 and slide contact 39a and actuates the operating means of the numbering device 40 to shift the same to the next following number.

Consequently, all copy sheets printed with different successive text sections are consecutively numbered by the numbering device.

If for a particular organizational problem, all copy sheets are to be consecutively numbered, switch 55 is opened and the clearing of the numbering device is prevented.

If the machine is used as a duplicator, switch 56 is opened, and the entire circuit illustrated in FIG. 4 is disconnected.

On the other hand, if the selection of the text section to be printed is carried out by actuation of selector switch 34, as explained above, several imprints of the same text section can be made on successive copy sheets, until key switch 34 is again actuated. In this event, groups of copy sheets having the same text section printed thereon, are imprinted with the same identification number by the numbering device, since the same is shifted to the next following number upon energization of actuating electromagnet 38 by selector switch 34, which also causes by energization of the second actuating electromagnet 35, the displacement of line cam 18 which results in the printing of a different text section on the next following copy sheet or copy sheets.

Therefore, electromagnets 38 and 35, and selector switch 34 constitute actuating means controlling the printing means 1, 27 to print any one text section or line of the printing form, a different text section on at least one other copy sheet, and also controlling the numbering device 40 to switch the same to the next following number so that copy sheets on which different text sections are printed, are imprinted by the numbering device 40 with consecutive numbers. The same identification number, however, appears on several copy sheets if the same have the same text section or line printed thereon. This is contrary to the prior art in which all consecutive copy sheets are imprinted with consecutive numbers.

Figure 5:
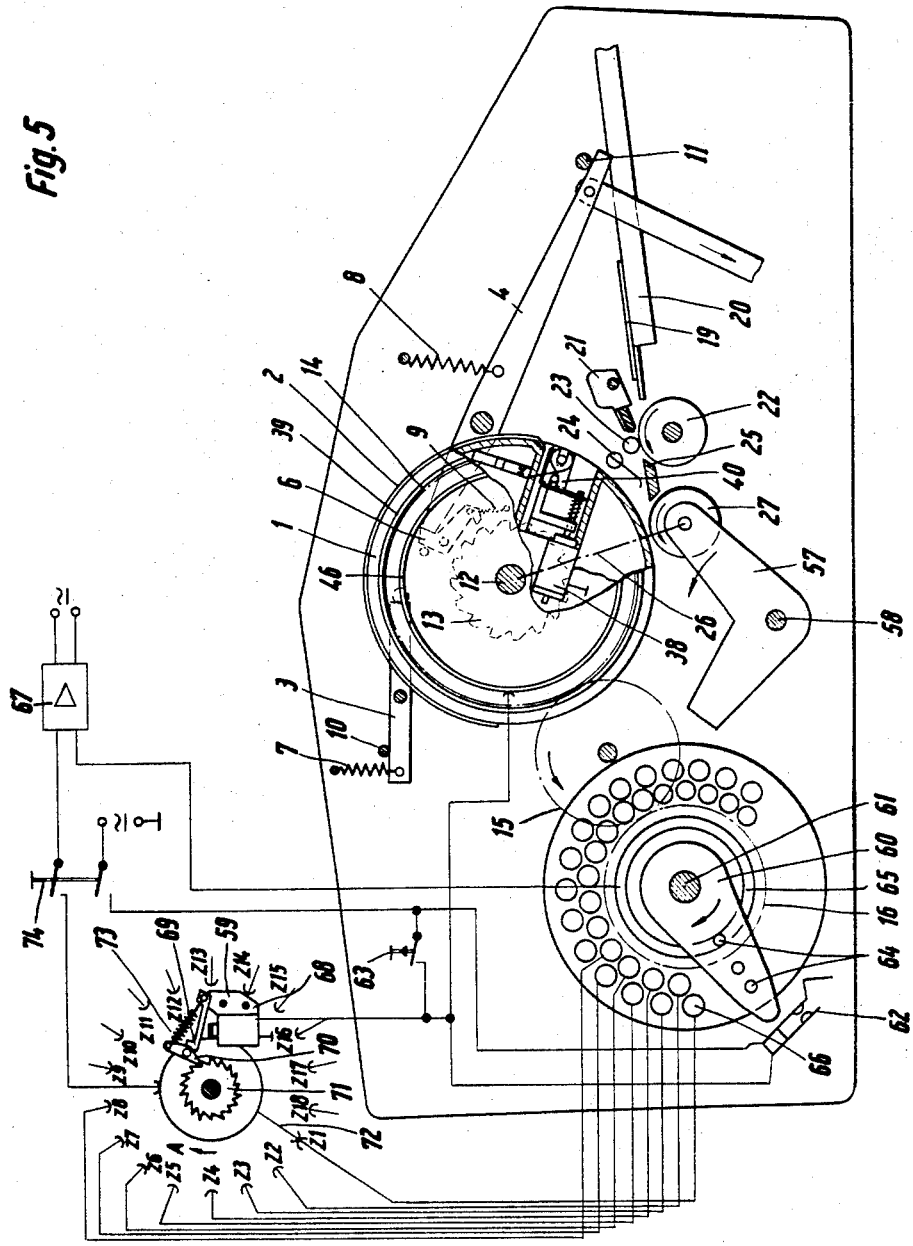
FIG. 5 is partly an elevation, partially in section, illustrating a numbering arrangement according to the invention applied to another duplicating machine, and is partly a diagram illustrating the electric circuit of the duplicating machine.

FIG. 5 illustrates a modified numbering arrangement according to the invention which is applied to a different selective duplicating machine.

As in the embodiment of FIG. 1, a printing drum 1 carrying a printing form 2 having text sections, such as lines, as shown in FIG. 11a is rotated by a one-revolution clutch including levers 3, 4, pawl 6 and coupling wheel 13, and a numbering device 40 which is constructed exactly as described with reference to FIGS. 1 and 2, is mounted in the recess of the printing drum, and supplied with a voltage by a slide ring 46. Transporting rollers 22 supply a copy sheet 19 moistened by moistening means 21 to the printing line between printing drum 1 and counterpressure roller 27 which is mounted on a pair of angular levers 57 supported on a shaft 58 for movement between the illustrated inoperative position and the printing position engaging the printing drum. An electromagnet is connected with levers 57 to operate the counterpressure roller, when energized.

Printing drum 1 is connected by a gear train 14, 15, 16 with a rotary contact arm 60 having one contact 64 sliding on a circular slide ring 65, and two contacts 64 cooperating with two circular rows of stationary contacts 66 which are respectively connected with contacts $Z_1$ to $Z_{18}$ which are correlated with eighteen lines or other text sections of the printing form 2. A voltage source is connected by an amplifier to switch 74, and over the printing electromagnet with slide ring 65. Switch 74 has a second contact connected to a source of voltage. One contact of switch 74 is connected by a slide ring to a turnable member secured to a stepping wheel 71 and having a contact arm 72 passing consecutively over fixed contacts $Z_1$ to $Z_{18}$ when stepping wheel 71 is stepwise operated. A pawl 70 is operated by the armature 69 of an electromagnet 68 so that contact arm 72 is shifted to the next stationary contact upon energization of electromagnet 68. One terminal of electromagnet 68 is connected to mass, and the other terminal connected to one contact of a switch 62 whose other contact is connected to the second contact of switch 74. A manually operated switch 63 is connected in parallel to switch 62. The general arrangement of the stepping device 59 and contact arm 60 is not an object of the invention and disclosed, for example, in the U.S. Patents 2,906,202 and 3,245,367. Stepping device 59 controls the selection of the lines which are printed. After each revolution of the printing drum, the free end portion of contact arm 60, constituting a cam, operates switch 62 so that actuating electromagnet 68 operates pawl 70 to shift contact arm 72 to the next following stationary contact $Z_1$ to $Z_{18}$. When a contact 64 of contact arm 60 engages during its revolution the stationary contact 66 correlated with the same line of the printing form, the printing magnet is energized to operate levers 57 with counterpressure roller 27 so that an imprint of the respective line or text section is made on the printing form. A manual control and selection is obtained by actuating selector switch 63. If printing drum 1 is permitted to carry out several revolutions before selector switch 63 is again operated, and the circuit of switch 62 is interrupted in a manner which is not illustrated, the same line of the printing form is printed on successive copy sheets until selector switch 63 is again operated. Since selector switch 63 is connected to slide ring 46 which is connected with actuating electromagnet 38, the numbering device 40 shifted to the next number every time selector switch 63 is actuated, and consequently a group of copy sheets imprinted with the same line will be provided with the same number, while copy sheets having different text sections printed thereon under the control of selector switch 63, will receive imprints of consecutive numbers.

However, when selector switch 63 is left open, and switch 62 controls the operations, switch 62 will be closed at the end of each revolution by contact arm 60, so that contact arm 72 will be shifted after each revolution to the next following contact $Z_1$ to $Z_{18}$. When the respective correlated text section passes through the printing line during the following revolution, contacts 64 engage the respective stationary contact 66 and close the circuit of the printing magnet so that counterpressure roller 27 is moved to a printing position for printing the respective text section.

Whenever switch 62 is closed, actuating electromagnet 38 of the numbering device is energized through slide ring 46 and the respective slide contact so that the numbering device is shifted to print the next following number on the respective copy sheet.

The shifting of contact arm 72 takes place in the direction of the arrow A, and after each displacement of ratchet wheel 71 by pawl 70, spring 73 causes the pawl to fall into the next following notch of ratchet wheel 71 so that the respective stationary contact remains connected into the circuit during the entire revolution of the printing drum. When switch 74 is opened, the circuit is disconnected.

It will be seen that switch 63, switch 62 and actuating electromagnetic means 68 and 38 constitute actuating means for simultaneously controlling the printing means to print a different text section, and a numbering device to produce an imprint of a different identification number on a copy sheet.

Figure 6:
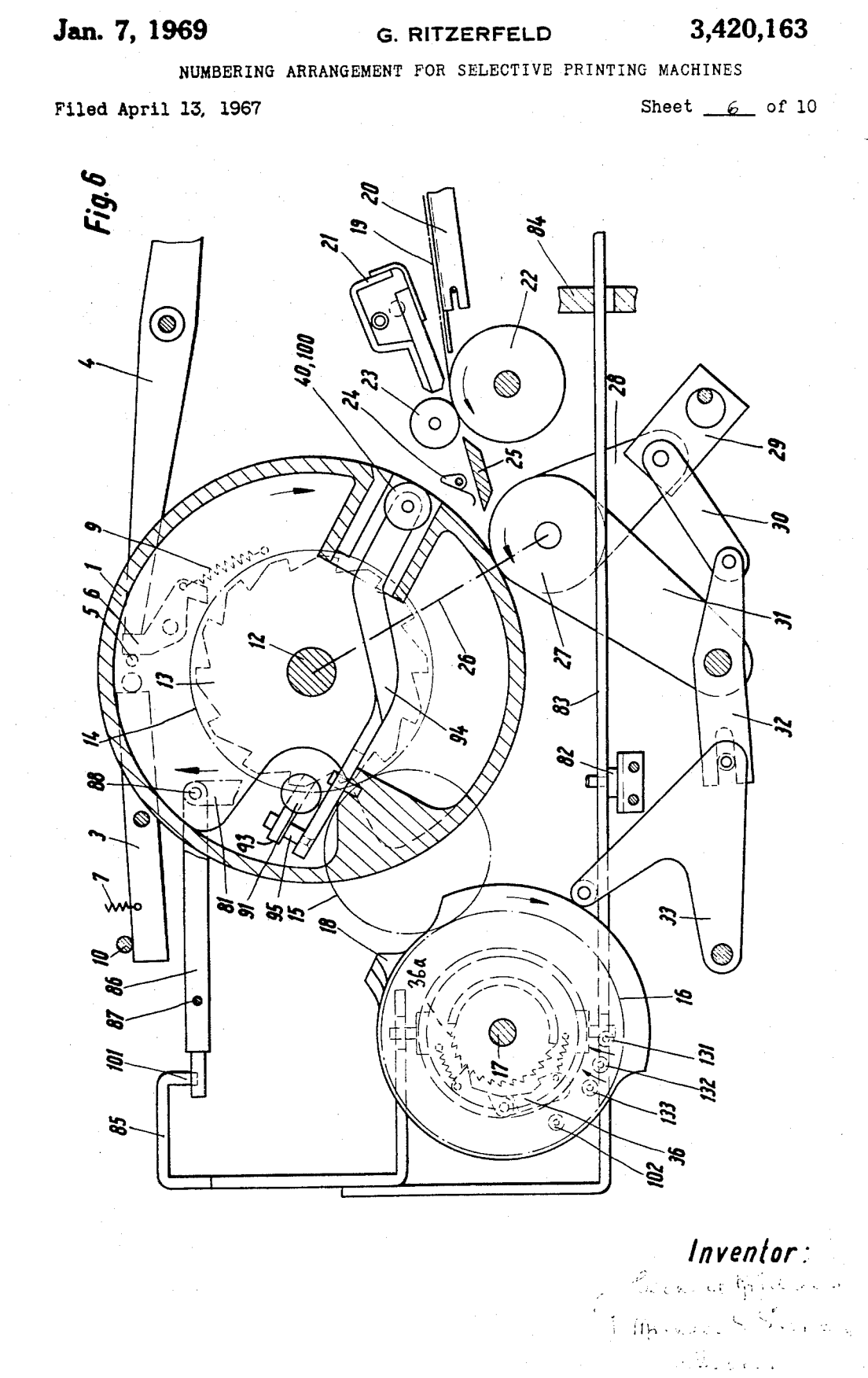
Figure 7:
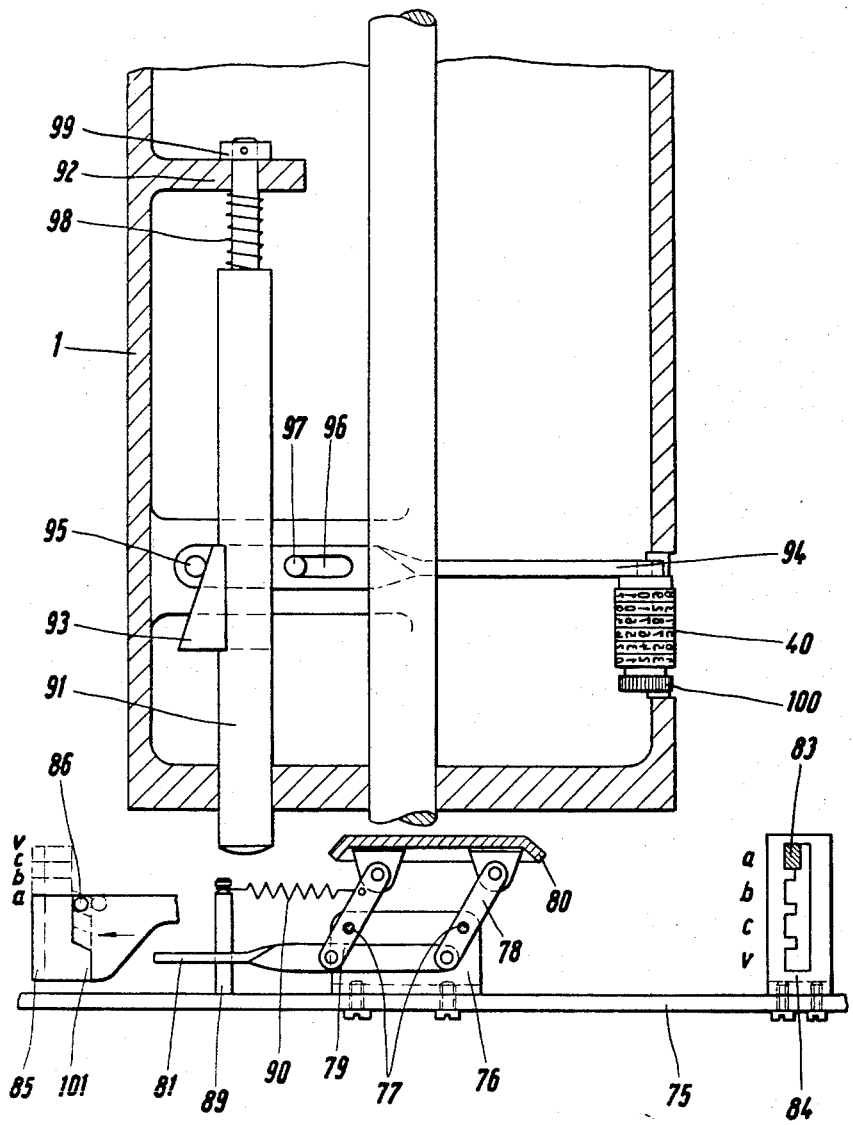
FIG. 7 is a sectional view illustrating the printing drum and mechanical actuating means of the embodiment of FIG. 6.

FIGS. 6 and 7 illustrate a modified embodiment of the invention in which the numbering device and the control means by which the printing means are controlled to print successive text sections, are operated by mechanical actuating means, in contrast to the embodiment of FIGS. 1 and 5, in which control means 36, 36a or 70, 71 are operated by electromagnets 51, 35 or 68.

The duplicating machine is generally constructed as described with reference to FIG. 1 and has a plurality of line cams 18 for operating the lever system of the counterpressure roller 27 which in its printing position in the proximity of the printing drum and a printing form thereon, produces imprints on a copy sheet supplied by transporting rollers 22, 23.

Printing drum 1 has a recess in which the numbering device 40 is located which is shifted to the next following number whenever an actuating member 94 is displaced. As best seen in FIG. 7, actuating member 94 has an elongated guide slot 96 receiving a guide pin fixed in printing drum 1. A cam follower pin on actuating member 94 cooperate with a wedge-shaped cam 93 secured to a shaft 91 which is urged by a spring 98 into the position illustrated in FIG. 7 in which a stop 99 abuts a projecting portion 92 of printing drum 1. When shaft 91 is shifted, cam 93 displaces cam follower pin 95 and thereby actuating member 94 so that the numbering device 40 is shifted to the next following number. Clearing of the numbering device 40 is effected after several revolutions of the printing drum, and when the same is at a standstill by manually turning a clearing knob 100.

As also shown in FIG. 7, a lateral frame wall 75 has a fixed bracket means 76 on which a pair of parallel levers 78, 79 is mounted for turning movement about pivots 77. One pair of ends of levers 78, 77 carrying an actuating cam 80, while the other ends of the levers are pivotally connected to a rod 81, also shown in broken lines in FIG. 6. The respective end of rod 81 is connected by pivot pin 88 to a lever 86 mounted on a pivot 87. The end of rod 86 cooperates with a stepped cam 101 carried by a portion 85 of an actuating lever 83 which is mounted for turning movement about a stationary pivot 82 and can be manually set to one of four positions arrested in notches a, b, c, v of an arresting means 84, as best seen in FIG. 7. In the position a, a single line is printed, in the position b two lines are printed, in the position c three lines are printed, and in the position v the entire printing form is duplicated.

In accordance with the angular position of actuating lever 83, portion 85 and cam 101 assume different positions shown in chain lines in FIG. 7 so that in the positions a, b, c, rod 86 is in engagement with the lower portion of the stepped cam 101, while rod 86 is displaced when engaging the higher portion of cam 101 in the position v of actuating level 83 and its portion 85. The control means for stepwise turning line cams 18 including pawl 36, ratchet wheel 36a, electromagnetic coupling 83 and spiral spring 37 are provided in the manner illustrated in FIG. 3. However, three rollers 131, 132, 133 are shiftable by actuating lever 83 to a position located in the path of movement of pawl 36 so that in the position a, roller 131, in the position b rollers 132 and 131 and in the position c rollers 131, 132, 133 are located in the circular path of movement of pawl 36. The mechanical linkage connecting rolls 131, 132, 133 with actuating lever 83 is of a conventional nature, and therefore not illustrated. If only one roll engages pawl 36 during rotation, the same momentarily releases ratchet wheel 36a permitting spring 37 to turn line cam 18 one step so that during the next following revolution, the next line or text section of the printing form is printed when the projection of line cam 18 engages cam follower lever 33 controlling the movements of the counterpressure roller. When two rolls 131, 132 successively engage pawl 36, line cam 18 is turned two steps, and when all three rolls engage pawl 36, line came turns three steps so that two or three consecutive lines, respectively, are printed on the same copy sheet.

Since spring 90 connects fixed pin 89 with lever 79, rod 81 is urged to turn lever 86 about pivot 87 to a position in which its end portion abuts cam 101.

When cam 80 is in its operative position due to placement of actuating lever 83 in one of the three positions a, b, c, shaft 91 engages cam 80 during each revolution of the printing drum 1 and is shifted against the action of spring 98 to a position in which wedge cam 93 displaces actuating member 94 to operate the numbering device 40 for setting the same to the next following number. Spring 98 returns the shaft 91 to its initial position after passage of cam 80.

When a duplicating operation is carried out with the entire printing form, actuating lever 83 is placed in the inoperative position v arrested by arresting means 83. The high portion of cam 101 is effective to displace the end portion of lever 86 to the position illustrated in broken lines in FIG. 7 whereby rod 81 is operated to move lever 77 and cam 80 to an inoperative position located outside of the path of movement of the end of shaft 91. Consequently, the machine can carry out duplication operations without operation of the numbering device 40. It will be seen that the actuating means 83, 85, 86, 81, 80, 91, 93, 95, 94 shift the numbering device 40 to the next number position whenever the actuating means also operate at least one of the rollers 131, 132, 133 to actuate control means 36, 36a which cause the printing of successive lines by angular displacement of the line cam 18.

A roll 102 is operated manually by a selector member, not shown, to move to a position engaging and releasing pawl 36 momentarily, permitting line cam 18 to make a single step. Roll 102 performs the function of the armature of electromagnet 35 in the embodiment of FIG. 1, and a new line or text section is printed on a number of copy sheets until roll 102 is again actuated. The manual means, not shown, controlling roll 102 are also connected with lever 86 to cause shifting of the numbering device 40 to the next following number through the actuating mechanism 94, 95, 93, 91, 80, 79, 78, 81 so that the same identification number is printed on all sheets receiving imprints of the same line or text section, while the next actuation of roll 102 causes printing of a different text section and numbering of the same by the next following number.

FIGS. 8 and 8a show an embodiment of the invention applied to a printing machine in which the printing drum 104 supports several mirror script printing forms, including a head master sheet 105 and a line or text section master sheet 106, as well as a cover sheet 107. Master sheets or printing forms 106 and 105 are best seen in FIGS. 11b and 11c and have leading edges 105', 106' clamped by holding means (not shown) on drum 104. The lines or text sections 105a, 106a extend in circumferential direction. The printing forms are axially shiftable on printing drum 104, similar to the U.S. Patent 3,220,342, W. Ritzerfeld et al., dated Nov. 30, 1965, and which is fixed on a shaft 103 connected by a gear train 108 with a shaft 109 which drives a cylinder 111 carrying a numbering device 110 which is shifted to consecutive numbers by an actuating member 115, see FIG. 8b, controlled by an actuating electromagnet 114 supplied with a voltage over slide rings 113 by slide contacts 112. Counter pressure rollers 104a, 111a cooperate with drum 104 and cylinder 111 whereby copy sheet 19 is imprinted. In known duplicators of this type it is necessary to shift the master sheet by its holder to the next line after printing of each line which is effected by actuation of a mechanical or electrical line shifting device.

The means by which the printing form is shifted to different positions for printing different lines, not shown, is connected with a switch, not shown, energizing actuating electromagnet 114 so that a different identification number is printed on successive copy sheets whenever the printing form is shifted to print a different line. After a printing operation by which the copy sheet is imprinted by a text portion of the master sheet and by the numbering device, the line shifting device is actuated in the usual manner, and the holder of the master sheet 106 is shifted with the same to place the next line in the printing position. At the same time the numbering device 110 is shifted to the next number, as described above. The newly set number is printed on the next copy sheet together with newly selected text portion.

FIG. 9 illustrates a duplicating machine in which the printing form 106, not shown in FIG. 9, and having text sections as shown in FIG. 11b can be shifted by a shifting means 119, 130 in axial direction of the printing drum 117 between positions in which different text sections of the printing form are printed. A chain 118 passes through a hollow shaft 116 supporting printing drum 117 and forms an endless loop over chain wheels 120 to 123. A chain wheel 123a is secured to chain wheel 123 and meshes with a chain 124 passing over a chain wheel 125 which has a second portion over which a chain 127 passes in an endless loop to drive another chain wheel 128 which actuates the numbering device 129 to assume positions for representing consecutive numbers. Chain wheels 125 are mounted on a shaft 126.

Shifting means 130 is stepwise shifted after each revolution of printing drum 117, or shifted under manual control after any selected numbers of revolutions of the printing drum, by means which are not shown in the drawing since they are of a conventional nature. Since displacement of shifting means 130 causes displacement of chains 118, 124, 127, numbering device 129 is shifted to a position for printing the next following number at the time of displacement of shifting means 130 with the printing form. The movement of the numbering device 129 can be electrically obtained by an electromagnet, not shown, or mechanically effected by a linkage, not shown, controlled by drum 117. As shown in FIG. 9a, copy sheet 19 is transported over a table 129a to receive the imprint of numbering device 129, and between drum 117 and counterpressure roller 117a to receive the imprint of a text line or section.

FIG. 10 illustrates a numbering device 40 operated by an actuating electromagnet 38 substantially corresponding to the construction described with reference to FIG. 1. The numbering device 40 has an operating member 131 on which a portion of an actuating member 132 rests. Actuating member 132 is pivotally mounted on a pin 133 carried by a bracket of printing drum 1, and urged by spring 134 against a stop 134a on the armature 134b of electromagnet 38. Upon energization of actuating electromagnet 38, armature 134b displaces actuating member 132 so that operating means 131 of the numbering device is operated and shifts the same to the next following number. Upon de-energization of actuating electromagnet 38, spring 134 returns actuating member 132 to its inoperative position.

It will be understood that each of the elements described above, or two or more together, may also find a useful application in other types of numbering arrangements differing from the types described above.

While the invention has been illustrated and described as embodied in a numbering arrangement for a rotary printing machine in which copy sheets having different text sections are successively imprinted by consecutive identification numbers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Numbering arrangement for printing machines, comprising, in combination, printing means including a rotary printing drum and means for holding on said printing drum a printing form having a plurality of text sections; means for supplying copy sheets to said printing means; control means having a first position for controlling said printing means to print the same text section on successive copy sheets, and a second position for controlling said printing means to print after printing a selected text section on at least one copy sheet, a different text section on at least one other copy sheet; actuating means having a normal inoperative condition, and being operable to an operative condition for moving said control means from said first position to said second position; and a numbering device for printing numbers on successive copy sheets, and printing the same number on the copy sheets having the same text section when said actuating means is in said normal inoperative condition and said control means is in said first position, said numbering device being operated by said actuating means in said operative condition to print consecutive numbers so that copy sheets on which different text sections are printed in said second condition of said control means, are consecutively numbered.

2. Numbering arrangement as claimed in claim 1 wherein said numbering device is mounted on said printing drum for rotation therewith.

3. Numbering arrangement as claimed in claim 1 wherein said control means control said printing means to print successive text sections on successive copy sheets during successive revolutions of said printing drum, and being operated by said actuating means so that copy sheets imprinted with successive text sections are consecutively numbered.

4. Numbering arrangement as claimed in claim 1 wherein said control means set said printing means to a plurality of positions for printing different text sections of said printing form; wherein said actuating means include first actuating electromagnetic means for operating said control means, second actuating electromagnetic means for operating said numbering device, and a selector switch for energizing said first and second actuating electromagnetic means.

5. Numbering arrangement as claimed in claim 4 wherein said printing drum has a cavity; wherein said second electromagnetic means and said numbering device are mounted in said cavity; and comprising slide ring means on said printing drum, and slide contact means cooperating with said slide ring means and connected with said second electromagnetic means.

6. Numbering arrangement as claimed in claim 4 wherein said first actuating electromagnetic means includes one electromagnet energized by said selector switch to said set control means to a different position, and another electromagnet actuating said control means after each revolution of said printing drum to cause printing of successive text sections; and comprising a switch for simultaneously energizing said other electromagnet and said second actuating electromagnetic means for said numbering device whereby successive text sections are printed on successive consecutively numbered copy sheets.

7. Numbering arrangement as claimed in claim 6 wherein said printing means include a counterpressure roller cooperating with said printing drum, cam follower means connected with said counterpressure roller for operating the same, and rotary cam means driven from said printing drum and including a line cam cooperating with said cam follower means to cause said counterpressure roller to be operative during the passage of a text section through the printing line; wherein said control means include a ratchet wheel secured to said line cam, spring means biasing said ratchet wheel to turn with said line cam in one direction, and pawl means co-operating with the ratchet wheel and being operable to permit stepwise turning of the same with said line cam; wherein said one electromagnet releases said pawl means upon closing of said selector switch during standstill of the machine; and wherein said other electromagnet includes a portion located in the path of movement of said pawl means during rotation of said ratchet wheel and line cam so that said pawl means is operated during each revolution of said line cam and said printing drum.

8. Numbering arrangement as claimed in claim 1 wherein said printing means comprise counterpressure roller means cooperating with said printing drum, and printing magnet means for operating said counterpressure roller means when energized; wherein said control means include a contact arm driven from said printing drum and a first set of stationary contacts respectively associated with positions of said printing drum in which correlated text sections of the printing form are located opposite said counterpressure roller means, a second set of stationary contacts respectively connected with the contacts of the first step, a stepping device including a pawl, and a contact secured to said stepping device and cooperating with said second set of contacts; wherein said actuating means include a first actuating electromagnet for operating said pawl of said stepping device, and a second actuating electromagnet for operating said numbering device, a manually operated switch for simultaneously energizing said first and second electromagnet means, and a switch operated by said contact arm during each revolution of the same and of said printing drum to energize said first and second actuating electromagnets.

9. Numbering arrangement as claimed in claim 1 wherein said printing means comprise counterpressure roller means cooperating with said printing drum, cam follower means for operating said counterpressure roller means, and a rotary line cam driven from said printing drum and cooperating with said cam follower means; wherein said control means shift said line cam stepwise for causing printing of different text sections; wherein said numbering device is located in said printing drum; and wherein said actuating means include an actuating member located in said printing drum for operating said numbering device and being shiftable to and from an operative position, a stationary cam having an inoperative position, and an actuating position located in the path of movement of said actuating member during rotation of said printing drum so that said numbering device is operated when said cam in said actuating position shifts said actuating member to said operative position, manually controlled lever means for shifting said cam between the inoperative and operative positions, means set by said manually controlled lever means to cause actuation of said control means and thereby shifting of said line cam during each revolution of said printing drum and line cam, and manually operable means for operating said control means during standstill of the machine to cause shifting of said line cam.

10. Numbering arrangement as claimed in claim 9 wherein said numbering device has a reciprocable operating member carrying a cam follower, wherein said actuating member in said printing drum has a cam portion cooperating with said cam follower and a portion projecting axially out of said printing drum and cooperating with said cam in said actuating position of the same.

11. Numbering arrangement as claimed in claim 1 wherein said means for holding the printing form are shiftable in axial direction of said printing drum for placing different text sections in a printing position; and wherein said actuating means in said operative condition effect shifting of said holding means and operation of said numbering device.

12. Numbering arrangement as claimed in claim 11 wherein said printing drum is mounted on a first shaft; comprising a second shaft, transmission means connecting said first and second shafts for rotation, said first and second shafts being parallel; a rotary member mounted on said second shaft and supporting said numbering device; wherein said actuating means include an electromagnet for operating said numbering device mounted on said rotary member; and electric circuit means connecting said holding means with that electromagnet so that upon shifting of said holding means said electromagnet is energized and operates said numbering device.

13. Numbering arrangement as claimed in claim 12 including another actuating electromagnet, and selector switch means for simultaneously energizing said actuating electromagnets.

14. Numbering arrangement as claimed in claim 1 wherein said means for holding said printing form is mounted on said printing drum for axial movement; and comprising mechanical transmission means connecting said holding means with said numbering device so that stepwise shifting of said holding means corresponding to the axial extension of a text section causes setting of said numbering device to the next following number; and means for axially shifting said holding means.

15. Numbering arrangement as claimed in claim 1 wherein said numbering device comprises a manually operable clearing means.

16. Numbering arrangement as claimed in claim 1 wherein said numbering device comprises an electric motor for clearing the same, said numbering device and electric motor being mounted in a cavity of said printing drum; and a clearing switch connected with said electric motor and being operable for starting the same so that said numbering device is cleared after imprinting a series of copy sheets with identification numbers.

17. Numbering arrangement as claimed in claim 16 wherein said switch is automatically operated in an initial position of rest of said printing means; and comprising circuit means for rendering said switch inoperative, if desired.

18. Numbering arrangement as claimed in claim 1 wherein said printing drum has a cavity; wherein said numbering device is mounted in said cavity and has an operating member; wherein said actuating means include an electromagnet located in said cavity and having an armature, a spring mounted on said armature, and an actuating lever mounted on said printing drum and connected with said spring and said armature so that said spring is compressed and said numbering device operated when said electromagnet is energized, said actuating means including a switch for energizing said electromagnet.

19. Numbering arrangement as claimed in claim 1 wherein said numbering device is mounted in a cavity of said printing drum; wherein said actuating means includes an electromagnet mounted in the cavity and connected with said numbering device for operating the same, and a manually operated selector switch for energizing said electromagnet.

References Cited

UNITED STATES PATENTS

| | | | |
|---|---|---|---|
| 1,920,232 | 8/1933 | Allen | 101—77 |
| 2,013,687 | 9/1935 | Jones et al. | 101—76 |
| 2,237,363 | 4/1941 | Ritzerfeld et al. | 101—47 |
| 2,753,791 | 7/1956 | Thurmann | 101—91 |
| 2,868,116 | 1/1959 | Ritzerfeld et al. | 101—132.5 |
| 2,906,202 | 9/1959 | Ritzerfeld et al. | 101—132.5 |
| 3,220,342 | 11/1965 | Ritzerfeld et al. | 101—91 |
| 3,245,367 | 4/1966 | Ritzerfeld et al. | 101—91 |
| 3,283,700 | 11/1966 | Tatham | 101—91 |

WILLIAM B. PENN, *Primary Examiner.*

U.S. Cl. X.R.

101—91